United States Patent
Taguchi et al.

(10) Patent No.: US 9,290,385 B2
(45) Date of Patent: Mar. 22, 2016

(54) HYDROGEN GENERATION APPARATUS AND FUEL CELL SYSTEM

(75) Inventors: Kiyoshi Taguchi, Osaka (JP); Tomoya Takeuchi, Osaka (JP); Kunihiro Ukai, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 659 days.

(21) Appl. No.: 13/700,016

(22) PCT Filed: May 17, 2012

(86) PCT No.: PCT/JP2012/003243
§ 371 (c)(1),
(2), (4) Date: Nov. 26, 2012

(87) PCT Pub. No.: WO2012/160790
PCT Pub. Date: Nov. 29, 2012

(65) Prior Publication Data
US 2013/0143135 A1 Jun. 6, 2013

(30) Foreign Application Priority Data
May 24, 2011 (JP) .................................. 2011-116213

(51) Int. Cl.
*H01M 8/06* (2006.01)
*C01B 3/38* (2006.01)

(52) U.S. Cl.
CPC . *C01B 3/38* (2013.01); *C01B 3/384* (2013.01); *H01M 8/0606* (2013.01);
(Continued)

(58) Field of Classification Search
CPC .................................................... H01M 8/0675
USPC ........................................................ 429/410
See application file for complete search history.

(56) References Cited

U.S. PATENT DOCUMENTS

2009/0087701 A1 4/2009 Kuwaba
2010/0068573 A1 3/2010 Tamura et al.
(Continued)

FOREIGN PATENT DOCUMENTS

EP 2228342 A1 9/2010
JP 2003-282114 A 10/2003
(Continued)

OTHER PUBLICATIONS

International Search Report issued in International Patent Application No. PCT/JP2012/003243 dated Jul. 3, 2012.
(Continued)

*Primary Examiner* — Nicholas P D'Aniello
(74) *Attorney, Agent, or Firm* — McDermott Will & Emery LLP

(57) ABSTRACT

A hydrogen generation apparatus (100) includes: a reformer (10) configured to generate a hydrogen-containing gas by using a raw material and steam; a raw material passage (21) through which the raw material that is supplied to the reformer (10) flows; a hydrodesulfurizer (13) provided downstream from a most downstream valve (11) on the raw material passage (21) and configured to remove a sulfur compound from the raw material; a sealer (15) provided on a passage (24) downstream from the reformer (10) and configured to block communication between the reformer (10) and the atmosphere; and a depressurizer (16) provided on the raw material passage (21) at a portion connecting the hydrodesulfurizer (13) and the reformer (10) and configured to release, to the atmosphere, pressure in the reformer (10) that has increased after the sealer (15) is closed.

11 Claims, 8 Drawing Sheets

(52) U.S. Cl.
CPC .... *H01M 8/0675* (2013.01); *C01B 2203/0233* (2013.01); *C01B 2203/0283* (2013.01); *C01B 2203/044* (2013.01); *C01B 2203/047* (2013.01); *C01B 2203/0445* (2013.01); *C01B 2203/066* (2013.01); *C01B 2203/1058* (2013.01); *C01B 2203/1064* (2013.01); *C01B 2203/127* (2013.01); *C01B 2203/1258* (2013.01); *C01B 2203/1288* (2013.01); *Y02E 60/50* (2013.01)

(56) References Cited

U.S. PATENT DOCUMENTS

2010/0304247 A1 12/2010 Tamura et al.
2010/0323257 A1 12/2010 Fujihara et al.
2011/0165477 A1* 7/2011 Yamamoto ................... 429/410

FOREIGN PATENT DOCUMENTS

| JP | 2006-278120 A | 10/2006 |
| JP | 2008-266118 A | 11/2008 |
| WO | WO 2010026875 A2 * | 3/2010 |

OTHER PUBLICATIONS

Extended European Search Report issued in European Application No. 12787346.1 dated Feb. 11, 2014.

* cited by examiner

HYDROGEN GENERATION APPARATUS AND FUEL CELL SYSTEM

RELATED APPLICATIONS

This application is the U.S. National Phase under 35 U.S.C. §371 of International Application No. PCT/JP2012/003243, filed on May 17, 2012, which in turn claims the benefit of Japanese Application No. 2011-116213, filed on May 24, 2011, the disclosures of which Applications are incorporated by reference herein.

TECHNICAL FIELD

The present invention relates to a hydrogen generation apparatus and a fuel cell system.

BACKGROUND ART

Steam reforming reaction is commonly used as a method of generating hydrogen to be supplied to a fuel cell. In the steam reforming reaction, for example, a reformer including a Ni (nickel)-based or Ru (ruthenium)-based reforming catalyst is used. In the reformer, a raw material (e.g., city gas supplied through piping in a city area or LP gas) is reacted with steam at a high temperature of approximately 600° C. to 700° C., and thereby a hydrogen-containing gas containing hydrogen as a main component is generated.

At the time, heating the reformer is necessary for causing the steam reforming reaction to progress, and a heating method commonly used for heating the reformer is as follows: a fuel off-gas, which remains after a fuel gas is used in electric power generation by a fuel cell, is combusted by a combustor (e.g., a burner). Here, water supplied to the reformer is evaporated by using an evaporator, and thereby steam for use in the reforming reaction of the reformer is generated.

The hydrogen-containing gas generated in the reformer contains carbon monoxide. The carbon monoxide poisons catalysts included in the fuel cell, and thereby hinders the electric power generation. Therefore, it is common that a shift converter configured to cause a shift reaction and a selective oxidizer configured to cause a selective oxidation reaction are provided for the purpose of reducing the concentration of carbon monoxide in the hydrogen-containing gas generated in the reformer. Accordingly, the reformer, shift converter, and selective oxidizer in a fuel cell system may be collectively referred to as a hydrogen generation apparatus.

Generally speaking, the raw material supplied to the reformer contains sulfur compounds. Specifically, city gas and LP gas each contain a sulfur content derived from their raw material, and also, sulfur compounds such as sulfides and mercaptans are added to these gases as odorants for the purpose of gas leakage detection.

It is known that such sulfur compounds negatively affect the reforming reaction, that is, the sulfur compounds poison and degrade the Ni-based and Ru-based reforming catalysts commonly used in the steam reforming reaction.

Therefore, the raw material such as city gas or LP gas is subjected to a suitable desulfurization process before the raw material is supplied to the hydrogen generation apparatus. In general, the raw material is desulfurized by a method in which zeolite (an adsorbent) is used to remove sulfur compounds from the raw material through normal-temperature adsorption.

However, in such a normal-temperature desulfurization method, it is necessary to replace the adsorbent every predetermined period since the amount of sulfur removed through the adsorption by the method is small. Accordingly, in a case where the hydrogen generation apparatus is operated for a long term, there is a disadvantage of high maintenance costs.

In order to overcome such a disadvantage, hydrodesulfurization methods with which sulfur can be removed by a large amount have been developed. For example, in one hydrodesulfurization method, a hydrogenation catalyst is used to react the sulfur compounds contained in the raw material with hydrogen at approximately 200° C. to 400° C., so that the sulfur compounds are transformed into hydrogen sulfide, and thereafter, an adsorption catalyst is used to adsorb the hydrogen sulfide at approximately 200° C. to 350° C. In this manner, the sulfur content in the raw material can be properly removed.

At the time of stopping the operation of the hydrogen generation apparatus, input and output portions that serve to allow the inside of the reformer to be in communication with the outside of the reformer are sealed so that combustible gases such as the raw material and the hydrogen-containing gas will not leak to the atmosphere (to the outside). Sealing the input and output portions also prevents external air from entering the inside of the reformer. The reforming catalyst provided in the reformer degrades if the catalyst is exposed to an oxidation gas (air) at a high temperature. Therefore, it is important to prevent external air from entering the inside of the reformer.

However, if the input and output portions are kept sealed, the inside of the reformer may become excessively pressurized or the inside of the reformer may become an excessive negative pressure state. If the inside of the reformer has become excessively pressurized, a solenoid valve for use in the sealing, or the like, is opened and closed, so that the pressure in the reformer is temporarily released to the atmosphere and thereby the inside of the reformer is depressurized. If the inside of the reformer has become an excessive negative pressure state, the raw material in a predetermined amount is forcibly supplied into the reformer. In this manner, the inside of the reformer is pressurized. These depressurizing operation and pressurizing operation are hereinafter referred to as pressure keeping operations of the reformer. By performing these pressure keeping operations, the operation of the hydrogen generation apparatus can be stopped properly with the internal pressure of the reformer kept in a suitable state, so that loads are not put on component devices.

However, if the operation of the hydrogen generation apparatus is stopped for the reason that electric power supply is cut off during the operation of the hydrogen generation apparatus due to power outage or the like, then the above-described pressure keeping operations cannot be performed. Accordingly, the inside of the reformer is left sealed, which may result in that the inside of the reformer becomes excessively pressurized due to evaporation of water remaining in at least one of the evaporator and the reformer.

In this respect, there is proposed a hydrogen generation apparatus including a depressurizer capable of depressurizing the inside of the reformer even when electric power supply is cut off (see Patent Literature 1).

CITATION LIST

Patent Literature

PTL 1: WO2009/087973

SUMMARY OF INVENTION

Technical Problem

Patent Literature 1 discloses in FIG. 4 that an on-off valve is provided downstream from a desulfurizer for the purpose of suppressing adsorption of steam to the desulfurizer, and that a depressurizer is provided downstream from the on-off valve. However, regarding a case where the desulfurizer is a hydrodesulfurizer, there has been no study on where the suitable position is for the depressurizer to be disposed.

The present invention has been made in view of the above. An object of the present invention is to provide a hydrogen generation apparatus including a hydrodesulfurizer, in which a depressurizer is disposed at a suitable position. Another object of the present invention is to provide a fuel cell system configured to generate electric power by using a hydrogen-containing gas supplied from the hydrogen generation apparatus.

Solution to Problem

In order to solve the above-described problems, a hydrogen generation apparatus according to one mode of the present invention in includes: a reformer configured to generate a hydrogen-containing gas by using a raw material and steam; a raw material passage through which the raw material that is supplied to the reformer flows; a hydrodesulfurizer provided downstream from a most downstream valve on the raw material passage and configured to remove a sulfur compound from the raw material; a sealer provided on a passage downstream from the reformer and configured to block communication between the reformer and the atmosphere; and a depressurizer provided on the raw material passage at a portion connecting the hydrodesulfurizer and the reformer and configured to release, to the atmosphere, pressure in the reformer that has increased after the sealer is closed.

A fuel cell system according to one mode of the present invention includes: the above hydrogen generation apparatus; and a fuel cell configured to generate electric power by using the hydrogen-containing gas that is supplied from the hydrogen generation apparatus.

Advantageous Effects of Invention

According to one mode of the present invention, discharging of hydrogen sulfide remaining in the hydrodesulfurizer to the outside of the hydrogen generation apparatus is suppressed as compared to a case where the depressurizer is provided upstream from the hydrodesulfurizer.

DESCRIPTION OF EMBODIMENTS

Figure 1:
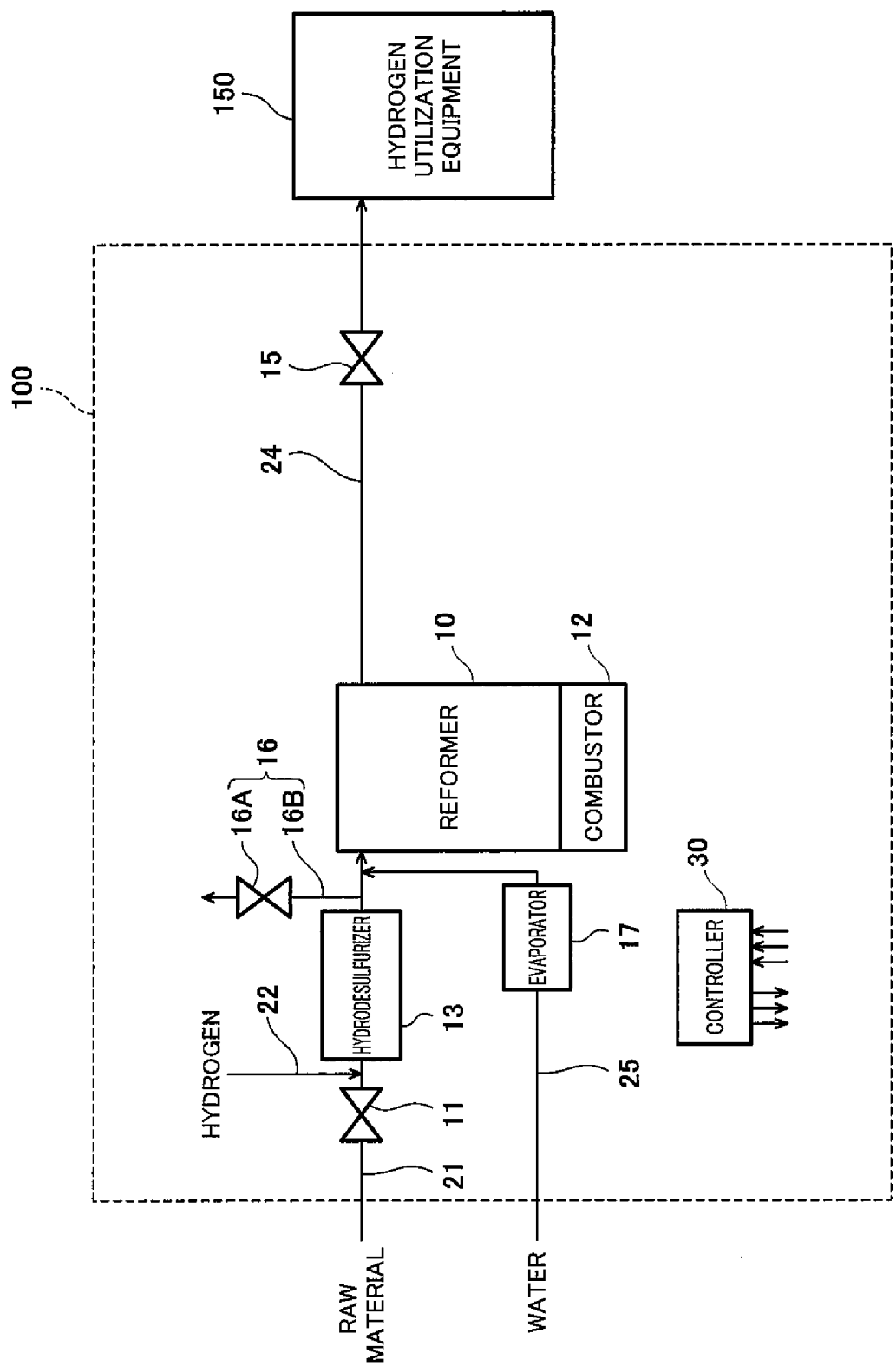
FIG. 1 is a block diagram showing an example of a hydrogen generation apparatus according to Embodiment 1.

The inventor conducted diligent studies regarding a hydrogen generation apparatus including a hydrodesulfurizer, in order to dispose a depressurizer at a suitable position. As a result of the studies, the inventor has obtained findings as described below.

The temperature of gas that has passed through the hydrodesulfurizer is increased. Therefore, in a case where an on-off valve is provided downstream from the hydrodesulfurizer, the on-off valve is required to have high thermal resistance. Thus, it is unfavorable to provide an on-off valve at a position downstream from the hydrodesulfurizer. For this reason, no on-off valve is provided downstream from the hydrodesulfurizer, and the most downstream on-off valve is provided on a raw material supply passage upstream from the hydrodesulfurizer.

Accordingly, so long as the depressurizer is provided at any point on a passage that is downstream from the most downstream on-off valve and upstream from the reformer, the depressurizer can perform depressurization while suppressing discharging of carbon monoxide to the outside of the hydrogen generation apparatus. However, even in a case where the depressurizer is provided on a passage that is downstream from the most downstream on-off valve and upstream from the reformer, if the passage on which the depressurizer is provided is one extending between the most downstream on-off valve and the hydrodesulfurizer, then hydrogen sulfide remaining in the hydrodesulfurizer is discharged to the outside of the apparatus, which is unfavorable.

In view of the above, the inventor has conceived of the idea that by providing the depressurizer on a raw material passage at a portion connecting the hydrodesulfurizer and the reformer, discharging of hydrogen sulfide remaining in the hydrodesulfurizer to the outside of the apparatus is suppressed.

Hereinafter, embodiments are described in detail with reference to the drawings. In the drawings, the same or corresponding components are denoted by the same reference signs, and there are cases where repetition of the same description is avoided. In the drawings, components necessary for describing the embodiments are shown, and the other components are omitted.

Embodiment 1

A hydrogen generation apparatus according to Embodiment 1 includes: a reformer configured to generate a hydrogen-containing gas by using a raw material and steam; a raw material passage through which the raw material that is supplied to the reformer flows; a hydrodesulfurizer provided downstream from a most downstream valve on the raw material passage and configured to remove a sulfur compound from the raw material; a sealer provided on a passage downstream from the reformer and configured to block communication between the reformer and the atmosphere; and a depressurizer provided on the raw material passage at a portion connecting the hydrodesulfurizer and the reformer and configured to release, to the atmosphere, pressure in the reformer that has increased after the sealer is closed.

According to the above configuration, discharging of hydrogen sulfide-containing gas existing in the hydrodesulfurizer to the outside of the apparatus is suppressed as compared to a case where the depressurizer is provided upstream from the hydrodesulfurizer.

Here, the depressurizer being "provided on the raw material passage at a portion connecting the hydrodesulfurizer and the reformer" means that the depressurizer is provided either directly or indirectly provided on the raw material passage. The wording "indirectly provided on the raw material passage" specifically means that the depressurizer is provided on a different fluid passage connected to the raw material passage. Examples of such cases include: a case where the depressurizer is provided on a water passage connected to the raw material passage; and a case where the depressurizer is provided on a steam passage connected to the raw material passage.

[Configuration of Hydrogen Generation Apparatus]

FIG. 1 is a block diagram showing an example of the hydrogen generation apparatus according to Embodiment 1.

As shown in FIG. 1, a hydrogen generation apparatus 100 includes: a reformer 10 configured to generate a hydrogen-containing gas by using a raw material and steam; and a raw material passage 21 through which the raw material that is supplied to the reformer 10 flows.

It should be noted that the raw material is a gas containing an organic compound, the constituent elements of which are at least carbon and hydrogen. Examples of the raw material include hydrocarbons exemplified by, for example, natural gas, city gas, LNG, LPG, and methane. The reformer 10 includes a reforming catalyst (not shown). For example, a Ru catalyst can be suitably used as the reforming catalyst. However, the reforming catalyst is not limited to this type of catalyst. A different noble metal catalyst or a nickel catalyst may be used as the reforming catalyst.

The reforming reaction of the reformer may be any reforming reaction, so long as the reforming reaction uses the raw material and steam. Specific examples of the reforming reaction include steam reforming reaction and autothermal reaction.

It should be noted that the hydrogen generation apparatus 100 may include a CO reducer configured to reduce the concentration of carbon monoxide in the hydrogen-containing gas that is discharged from the reformer 10 to a hydrogen supply passage 24. The CO reducer includes at least one of a shift converter and a CO remover, the shift converter being configured to reduce carbon monoxide through a shift reaction, the CO remover being configured to reduce carbon monoxide through at least one of an oxidation reaction and a methanation reaction.

For example, a raw material supply device which is not shown is disposed on the raw material passage 21. When the raw material supply device is operated, the raw material supplied from a raw material source flows through the raw material passage 21 into the reformer 10. The raw material supply device adjusts the flow rate of the raw material supplied to the reformer 10. For example, the raw material supply device includes at least one of a booster and a flow rate adjusting valve. Examples of the raw material source include: a raw material infrastructure with a supply pressure higher than the atmospheric pressure; and a canister storing the raw material.

As shown in FIG. 1, the hydrogen generation apparatus 100 includes an evaporator 17 configured to supply steam to the reformer 10.

The evaporator 17 is connected to a water supply passage 25 through which water flows. For example, a water supply device which is not shown is disposed on the water supply passage 25. When the water supply device is operated, water supplied from a water source flows through the water supply passage 25 into the evaporator 17. The position at which the evaporator 17 is disposed is not limited to this example, but may be any position so long as steam can be supplied to the reformer 10. For example, the evaporator 17 may be provided on the raw material passage 21 at a position downstream from a hydrodesulfurizer 13.

As shown in FIG. 1, the hydrogen generation apparatus 100 includes a combustor 12.

For example, the combustor 12 is configured as a burner. The combustor 12 is supplied with combustion air from an air supply device which is not shown, and is also supplied with a fuel gas. Accordingly, the combustor 12 can generate a high-temperature flue gas by combusting the fuel gas. The reformer 10 and the evaporator 17 exchange heat with the flue gas, and thereby the reformer 10 and the evaporator 17 are heated to respective suitable temperatures. For example, the raw material or the hydrogen-containing gas is used as the fuel gas. It should be noted that if the reforming reaction is an autothermal reaction, the combustor 12 may be eliminated.

As shown in FIG. 1, the hydrogen generation apparatus 100 includes the hydrodesulfurizer 13. The hydrodesulfurizer 13 is provided downstream from a most downstream valve 11 for use in opening/closing the raw material passage 21, and is configured to remove sulfur compounds from the raw material.

For example, a solenoid on-off valve can be used as the valve 11.

The hydrodesulfurizer 13 causes a reaction between hydrogen and the sulfur compounds which are odor components in the raw material, thereby producing hydrogen sulfide, which is then removed by adsorption. It should be noted that the hydrodesulfurizer 13 includes a hydrodesulfurization catalyst (not shown). For example, a copper-zinc catalyst can be suitably used as the hydrodesulfurization catalyst. However, the hydrodesulfurization catalyst is not limited to this type of catalyst. A zinc oxide catalyst alone, a Mo-based catalyst alone, or a combination of a zinc oxide catalyst and a Mo-based catalyst may be used as the hydrodesulfurization catalyst.

As shown in FIG. 1, a hydrogen guide passage 22 is used to guide the hydrogen-containing gas to the raw material passage 21. The hydrogen guide passage 22 merges with the raw material passage 21 at a point upstream from the hydrodesulfurizer 13.

Although in this example the merge point where the hydrogen guide passage 22 and the raw material passage 21 merge together is positioned on the raw material passage 21 between the valve 11 and the hydrodesulfurizer 13, the merge point is not limited to this. Alternatively, the hydrogen guide passage 22 and the raw material passage 21 may merge together on the raw material passage 21 at a point upstream from the valve 11. That is, the hydrogen guide passage 22 and the raw material passage 21 may merge together at any point, so long as the merge point on the raw material passage 21 is upstream from the hydrodesulfurizer 13.

Moreover, the valve 11 may be disposed downstream from the merge point. That is, the valve 11 may be disposed at any point, so long as the valve 11 is disposed on the raw material passage 21 at a point upstream from the hydrodesulfurizer 13.

Furthermore, the hydrogen guide passage 22 may be configured as a recycle passage (not shown) through which the hydrogen-containing gas discharged from the reformer 10 partially returns. This makes it possible to readily supply hydrogen for use in a hydrogenation reaction to the hydrodesulfurizer 13. It should be noted that, in this case, an on-off valve may be provided on the recycle passage.

As shown in FIG. 1, the hydrogen generation apparatus 100 includes a sealer 15. The sealer 15 is provided on the hydrogen supply passage 24 downstream from the reformer 10 and is configured to block communication between the reformer 10 and the atmosphere.

For example, a solenoid on-off valve can be used as the sealer 15.

When the sealer 15 is opened, the hydrogen-containing gas in the hydrogen supply passage 24 is sent to hydrogen utilization equipment 150. Then, the hydrogen-containing gas is utilized by the hydrogen utilization equipment 150 for various purposes. For example, if the hydrogen utilization equipment 150 is a fuel cell, a fuel cell system can be constructed, the fuel cell system including: the hydrogen generation apparatus 100; and the fuel cell which generates electric power by using the hydrogen-containing gas that is supplied from the hydrogen generation apparatus 100.

At the time of stopping the hydrogen generation apparatus 100, the sealer 15 is closed. Thereafter, the pressure in the reformer 10 may increase due to evaporation of water remaining in at least one of the evaporator 17 and the reformer 10.

For this reason, as shown in FIG. 1, the hydrogen generation apparatus 100 includes a depressurizer 16 configured to release, to the atmosphere, the pressure in the reformer 10 that has increased after the sealer 15 is closed.

As shown in FIG. 1, the depressurizer 16 includes a depressurizing valve 16A and a branch passage 16B. That is, in this example, the branch passage 16B which allows the raw material passage 21 to be in communication with the outside (the atmosphere), and the depressurizing valve 16A on the branch passage 16B, form the depressurizer 16.

For example, a relief valve including a pressure relief mechanism utilizing sealing by spring pressure, or a solenoid valve including a spring sealing mechanism, can be used as the depressurizing valve 16A. In this case, if the internal pressure of space to be sealed, the space including the reformer 10, is normal, then the depressurizing valve 16A is sealed by spring pressure, and if the internal pressure of the space to be sealed has increased to exceed a predetermined value, then the sealing by the spring is released. The predetermined internal pressure of the space to be sealed, above which pressure the sealed state of the depressurizer 16 is released, is set to be lower than the withstanding pressure of a container containing the reformer 10.

Accordingly, even if the operation of the hydrogen generation apparatus 100 is stopped for the reason that electric power supply is cut off during the operation of the hydrogen generation apparatus 100 due to power outage or the like, the pressure in the reformer 10 can be released to the atmosphere by using the depressurizer 16 when the pressure in the reformer 10 has exceeded the predetermined value.

As shown in FIG. 1, in the hydrogen generation apparatus 100 according to the present embodiment, the depressurizer 16 is provided on the raw material passage 21 at a portion connecting the hydrodesulfurizer 13 and the reformer 10. That is, in this example, the most downstream valve 11 for use in opening/closing the raw material passage 21, the hydrodesulfurizer 13, the depressurizer 16, and the reformer 10 are arranged on the raw material passage 21 in said order in a direction in which the raw material flows. However, the evaporator 17 may be disposed between the depressurizer 16 and the reformer 10.

As described above, in this example, the most downstream valve 11 for use in opening/closing the raw material passage 21 is provided upstream from the hydrodesulfurizer 13. Therefore, the valve 11 is not required to have such high thermal resistance as compared to a case where the most downstream valve 11 is provided downstream from the hydrodesulfurizer 13.

Assume a case where the components are arranged in the following order: the most downstream valve 11, the depressurizer 16, the hydrodesulfurizer 13, and the reformer 10 (evaporator 17). In this case, there is a possibility that when the depressurization using the depressurizer 16 is performed, hydrogen sulfide remaining in the hydrodesulfurizer 13 is discharged to the outside of the hydrogen generation apparatus 100 together with gas that has passed through the hydrodesulfurizer 13.

However, such a possibility is reduced in the hydrogen generation apparatus 100 according to the present embodiment since the components are arranged as described above in the following order: the valve 11, the hydrodesulfurizer 13, the depressurizer 16, and the reformer 10.

As shown in FIG. 1, the hydrogen generation apparatus 100 includes a controller 30. The controller 30 includes an arithmetic processing unit configured to execute a control program and a storage unit storing the control program. The controller 30 may be configured as a single controller or a plurality of controllers. The arithmetic processing unit is configured as a CPU, MPU, or the like. The storage unit is configured as a memory, for example.

<First Disposition Example of Depressurizer>

Described next is a first disposition example of the depressurizer 16 of the hydrogen generation apparatus 100 according to Embodiment 1.

In the hydrogen generation apparatus according to the present embodiment, the depressurizer is connected to the branch passage which branches off from the raw material passage. The raw material passage is formed such that the passage extends in the form of an upward slope from the hydrodesulfurizer and then extends horizontally, and is thereafter connected to the reformer. The branch passage extends horizontally from the raw material passage, branching off at a point where the upward slope portion and the horizontally extending portion meet.

As in this example, it is preferred for the branch passage to extend horizontally from the raw material passage, branching off at the point where the upward slope portion and the horizontally extending portion meet. The reason for this is described below.

Firstly, in a case where the reformer and the hydrodesulfurizer are integrated in such a manner that they are heat exchangeable with each other and covered with a heat insulating material, it is difficult for the branch passage to extend downward from the horizontally extending portion of the raw material passage. Secondly, if the branch passage extends upward, then the extending direction of the piping of the passage needs to be turned by a greater angle along the way leading to a tank. That is, the hydrogen generation apparatus 100 according to the present embodiment provides an advantage that drawing the piping from the depressurizer to a receiver (e.g., a tank) positioned below the aforementioned meeting point, the receiver receiving exhaust gas from the depressurizer, is easy.

Figure 2:
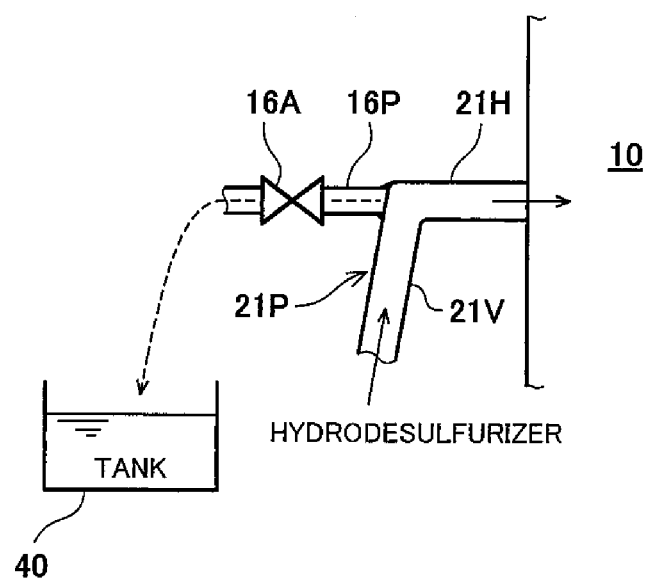
FIG. 2 shows a disposition example of a depressurizer of the hydrogen generation apparatus according to Embodiment 1.

FIG. 2 shows a disposition example of the depressurizer of the hydrogen generation apparatus according to Embodiment 1.

As shown in FIG. 2, a raw material piping 21P which serves as the raw material passage 21 includes: a slope portion 21V extending in the form of an upward slope from the hydrodesulfurizer 13; and a horizontal portion 21H extending horizontally in such a manner that the raw material piping 21P bends. As shown in FIG. 2, a branch piping 16P which serves as the branch passage 16B of the depressurizer 16 extends horizontally from the raw material piping 21P, branching off at a point where the upward slope portion and the horizontally extending portion meet (i.e., branching off at the bending portion of the raw material piping 21P). The depressurizing valve 16A of the depressurizer 16 is provided along the branch piping 16P, and the branch piping 16P extends so as to guide gas (e.g., steam) flowing through the branch piping 16P to a tank 40.

Accordingly, in this example, when the inside of the reformer 10 is depressurized by using the depressurizer 16, high-temperature gas (e.g., steam) flowing through the branch piping 16P and condensation water produced from the steam can be guided to the tank 40.

It should be noted that the above-described first disposition example is merely an example and the manner of disposing the depressurizer is not limited to this example. The depressurizer may be disposed in any manner, so long as the reformer 10 in which the pressure has increased can be depressurized.

<Second Disposition Example of Depressurizer>

Described next is a second disposition example of the depressurizer 16 of the hydrogen generation apparatus 100 according to Embodiment 1.

Figure 3:
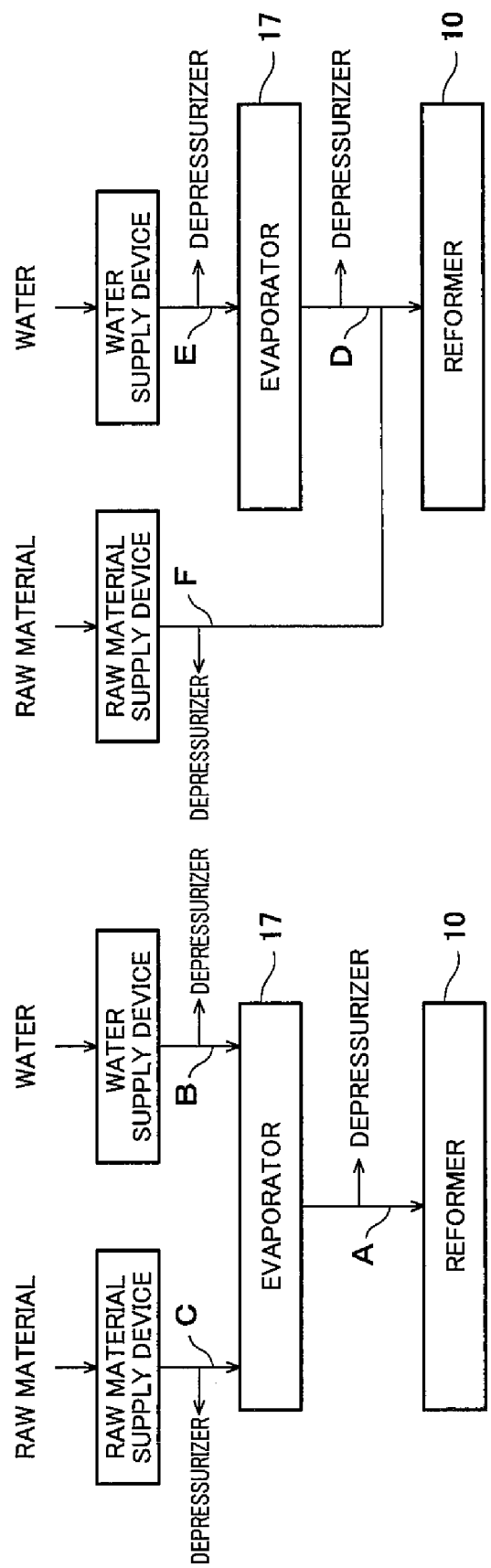
FIGS. 3A and 3B show a disposition example of the depressurizer of the hydrogen generation apparatus according to Embodiment 1.

FIGS. 3A and 3B show a disposition example of the depressurizer of the hydrogen generation apparatus according to Embodiment 1.

In relation to the hydrogen generation apparatus that is configured such that a mixture gas of the raw material and steam is generated in the evaporator 17 and is supplied to the reformer 10, FIG. 3A shows positions at which the depressurizer 16 can be disposed. Although not shown, the hydrodesulfurizer 13 is provided on a passage C at a position upstream from the depressurizer which is also provided on the passage C.

In relation to the hydrogen generation apparatus that is configured such that the raw material and the steam from the evaporator 17 are mixed together in a passage that is in communication with the reformer 10 and the resultant mixture gas is supplied to the reformer 10, FIG. 3B shows positions at which the depressurizer 16 can be disposed. Although not shown, the hydrodesulfurizer 13 is provided on a passage F at a position upstream from the depressurizer which is also provided on the passage F.

In the former case (FIG. 3A), the depressurizer 16 may be provided on a passage A between the evaporator 17 and the reformer 10. If the depressurizer 16 is provided on a passage upstream from the evaporator 17, the raw material or water in the passage is partially discharged at the time of releasing gas from the inside of the reformer 10. Accordingly, there is a possibility that at the time of next start-up, it takes more time than normal for the raw material that starts to be supplied from the raw material supply device, or the water that starts to be supplied from the water supply device, to reach the reformer 10. However, with the configuration of this example, such a problem is less likely to occur.

Alternatively, the depressurizer 16 may be provided on a passage upstream from the evaporator 17. In this case, the depressurizer 16 is in indirect communication with the reformer 10 via the evaporator 17. Therefore, leakage of gas (carbon monoxide) from the inside of the reformer 1 is suppressed as compared to the case where the depressurizer 16 is provided on the passage A connecting the evaporator 17 and the reformer 10.

A passage B between the water supply device and the evaporator 17 is one example of the passage upstream from the evaporator 17. When the depressurizer 16 is provided on the passage C, there is a possibility that the combustible raw material existing in the passage C is discharged to the outside of the hydrogen generation apparatus 100 at the time of releasing gas from the inside of the reformer 10. However, such a possibility is reduced when the depressurizer 16 is provided on the passage B. It should be noted that this example corresponds to the case where the depressurizer is indirectly provided on the raw material passage.

The passage C between the raw material supply device and the evaporator 17 is another example of the passage upstream from the evaporator 17. When the depressurizer 16 is provided on the passage B, there is a possibility that deposition of ions dissolved in the water in the passage B occurs, which may cause a defect such as a stuck-state of the depressurizer 16. However, such a possibility is reduced when the depressurizer 16 is provided on the passage C. Although not shown in FIG. 3A, the passage C is a passage downstream from the hydrodesulfurizer 13.

In the latter case (FIG. 3B), the depressurizer 16 may be provided on a passage D between the evaporator 17 and the reformer 10. If the depressurizer 16 is provided on a passage E upstream from the evaporator 17 or on the passage F connecting the reformer 10 and the raw material supply device, the raw material or water in the passage is partially discharged at the time of releasing gas from the inside of the reformer 10. Accordingly, there is a possibility that at the time of next start-up, it takes more time than normal for the raw material that starts to be supplied from the raw material supply device, or the water that starts to be supplied from the water supply device, to reach the reformer 10. However, with the configuration of this example, such a possibility is reduced. It should be noted that disposing the depressurizer 16 on the passage D as shown in FIG. 3B corresponds to the case where the depressurizer is indirectly provided on the raw material passage.

Alternatively, the depressurizer 16 may be provided on a passage upstream from the evaporator 17. In this case, the depressurizer 16 is in indirect communication with the reformer 10 via the evaporator 17. Therefore, leakage of gas (carbon monoxide) from the inside of the reformer 1 is less likely to occur as compared to the case where the depressurizer 16 is provided on the passage D connecting the evaporator 17 and the reformer 10. The passage E connecting the water supply device and the evaporator 17 is one example of the passage upstream from the evaporator 17. When the depressurizer 16 is provided on the passage F, there is a possibility that the combustible raw material existing in the passage F is discharged to the outside of the hydrogen generation apparatus 100 at the time of releasing gas from the inside of the reformer 10. However, such a possibility is reduced when the depressurizer 16 is provided on the passage E. It should be noted that disposing the depressurizer 16 on the passage E corresponds to the case where the depressurizer is indirectly provided on the raw material passage.

Further alternatively, the depressurizer 16 may be provided on the passage F between the raw material supply device and the reformer 10. When the depressurizer 16 is provided on the passage E, there is a possibility that deposition of ions dissolved in the water in the passage E occurs, which may cause a defect such as a stuck-state of the depressurizer 16. However, such a possibility is reduced when the depressurizer 16 is provided on the passage F.

It should be noted that the above-described second disposition example is merely an example and the manner of disposing the depressurizer is not limited to this example. The depressurizer may be disposed in any manner, so long as the reformer 10 in which the pressure has increased can be depressurized.

<Third Disposition Example of Depressurizer>

The hydrogen generation apparatus of this example includes: an evaporator configured to generate steam; and a water passage connected to the evaporator. The evaporator may be provided on the raw material passage, and in the evaporator, the depressurizer may be disposed at a position away from a passage through which water having flowed into the evaporator flows.

According to the above configuration, a possibility of failure in the depressurization is reduced as compared to a case where the depressurizer is provided on the passage through which water having flowed into the evaporator flows. If the depressurizer is provided on the passage through which water having flowed into the evaporator flows, there is a possibility that water in liquid form flows into the sealing mechanism of the depressurizer, causing a change in the pressure necessary for releasing the sealed state of the depressurizer, resulting in an occurrence of failure. Specifically, if the pressure necessary for releasing the sealed state of the depressurizer becomes lower, there is a possibility that even when the hydrogen-containing gas is being generated in a normal manner in the reformer, the depressurizer becomes opened, which causes leakage of combustible gas such as the raw material through the depressurizer. On the other hand, if the pressure necessary for releasing the sealed state of the depressurizer becomes higher, there is a possibility that even when the internal pressure of the reformer exceeds the withstanding pressure, the sealed state of the depressurizer is not released, which causes breakdown of the reformer. However, by adopting the above-described configuration, the possibilities of such failures are reduced.

In the hydrogen generation apparatus of this example, in the evaporator, the depressurizer may be provided on a passage upstream from a water inlet 20 of the evaporator, the water inlet 20 allowing water from the water passage to flow into the evaporator.

According to the above configuration, a possibility of failure in the depressurization is reduced as compared to a case where the depressurizer is provided downstream from the water inlet 20. Water in liquid form that has flowed into the evaporator through the water inlet 20 flows toward a downstream passage. Therefore, if the depressurizer is provided on a passage downstream from the inlet 20, there is a possibility that water in liquid form flows into the depressurizer, causing a failure in the depressurizing operation of the depressurizer. However, such a possibility is reduced by adopting the above-described configuration.

In the hydrogen generation apparatus of this example, in the evaporator, the depressurizer may be disposed at a position above the water inlet 20.

According to this configuration, a possibility of failure in the depressurization is reduced as compared to a case where the depressurizer is disposed below or at the same height as the water inlet 20. Even in a case where the depressurizer is disposed at a position away from the passage through which water having flowed into the evaporator flows (but on, for example, a passage upstream from the water inlet 20), if the depressurizer is disposed below or at the same height as the water inlet 20, there is a possibility that water in liquid form flows into the depressurizer, causing a failure in the depressurizing operation of the depressurizer. However, such a possibility is reduced by adopting the above-described configuration.

Next, the third disposition example of the depressurizer 16 of the hydrogen generation apparatus 100 according to the present embodiment is described in detail.

Figure 4:
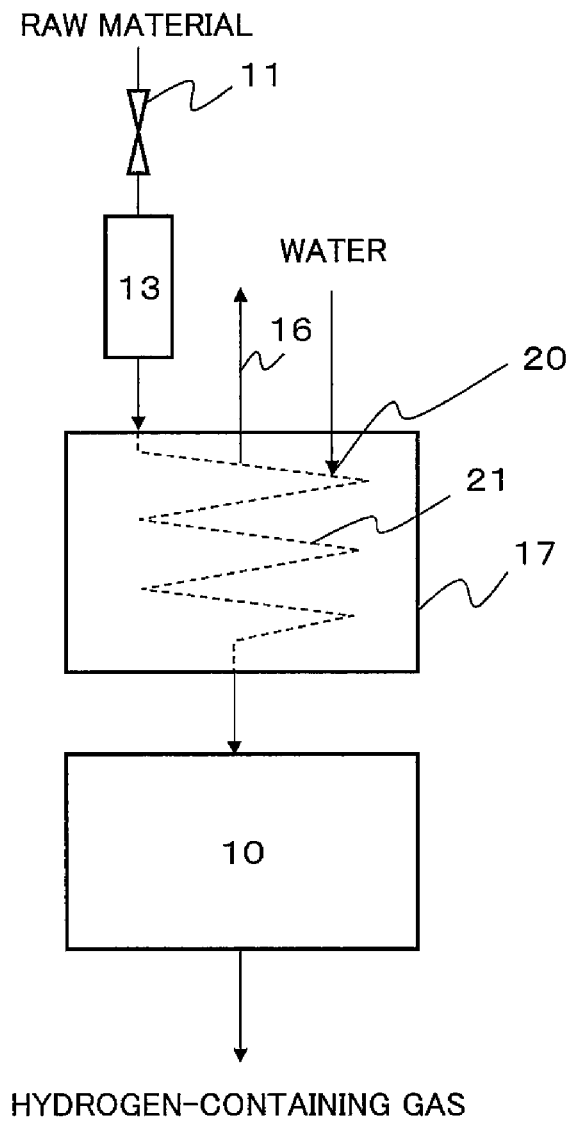
FIG. 4 shows a disposition example of the depressurizer of the hydrogen generation apparatus according to Embodiment 1.

FIG. 4 shows a disposition example of the depressurizer of the hydrogen generation apparatus 100 according to Embodiment 1.

As shown in FIG. 4, in the hydrogen generation apparatus 100 of this example, the raw material passage 21 is provided within the evaporator 17. The evaporator 17 is provided with the water inlet 20. Water in liquid form that has flowed into the evaporator 17 through the water inlet 20 flows through the raw material passage 21. In the evaporator 17, the water in liquid form flowing through the raw material passage 21 evaporates. Accordingly, a mixed gas of the raw material and steam flows through the raw material passage 21 into the reformer 10.

The depressurizer 16 is provided at the evaporator 17 and is disposed at a position away from a passage (of the raw material passage 21) through which the water in liquid form having flowed into the evaporator 17 flows. Specifically, as shown in FIG. 4, the depressurizer 16 is disposed on a passage (of the raw material passage 21) that is upstream from the water inlet 20. It should be noted that the third disposition example is merely an example, and the depressurizer 16 may be disposed at any position, so long as the position is away from the passage (of the raw material passage 21) through which the water in liquid form having flowed into the evaporator 17 flows.

The raw material passage 21 provided within the evaporator 16 is formed as a downward slope toward the reformer 10. Accordingly, the depressurizer 16 is disposed at a position above the water inlet 20 of the evaporator.

[Operation of Hydrogen Generation Apparatus]

Next, the operation of the hydrogen generation apparatus 100 according to the present embodiment (the hydrogen generation operation of the hydrogen generation apparatus 100) is described. It should be noted that the operation described below is performed as a result that the controller 30 controls the hydrogen generation apparatus 100.

When the hydrogen generation apparatus 100 is started, fuel combustion by the combustor 12 is started. At the time, the sealer 15 and the valve 11 are closed while a combustion fuel gas passage (not shown) branching off from the hydrogen supply passage 24 and extending to the combustor 12 is in a state of allowing gas to pass through.

Accordingly, when the operation of the raw material supply device is started and thereby the raw material is supplied to the reformer 10, the raw material that has passed through the reformer 10 is supplied to the combustor 12 through the combustion fuel gas passage. At the same time, the operation of the air supply device is started and thereby the combustion air is supplied to the combustor 12. In the combustor 12, an ignition operation by an ignition electrode (not shown) is performed, and the raw material is combusted by using the combustion air.

As a result, the reformer 10 and the evaporator 17 are heated by combustion heat supplied from the combustor 12.

Next, the on-off valve on the recycle passage which is one example of the hydrogen guide passage 22 is opened, so that part of the gas from the reformer 10 flows through the recycle passage and thereby returns to the raw material passage 21 upstream from the hydrodesulfurizer 13 (i.e., circulating operation).

Next, the operation of the water supply device is started, and thereby steam is generated in the evaporator 17 and supplied to the reformer 10. After the supply of the steam is started, when the composition of the hydrogen-containing gas generated by the reformer 10 has become such a suitable composition that the hydrogen-containing gas can be supplied to the hydrogen utilization equipment 150, the sealer 15 is opened and the hydrogen-containing gas is supplied to the hydrogen utilization equipment 150.

At the time of stopping the hydrogen generation apparatus 100, the valve 11 and the sealer 15 are closed and the raw material supply device and the water supply device are stopped. Immediately after the hydrogen generation apparatus 100 is stopped, if residual water exists in at least one of the evaporator 17 and the reformer 10, then the pressure in the reformer 10 increases due to evaporation of the residual water. Therefore, a suitable valve (e.g., the sealer 15) that is blocking the communication between the reformer 10 and the atmosphere is opened, and thereby the inside of the reformer 10 is depressurized. By opening the valve, the pressure in the reformer 10 becomes substantially equal to the atmospheric pressure. This depressurizing operation may be performed a plurality of times as necessary.

If the operation of the hydrogen generation apparatus 100 is stopped for the reason that electric power supply is cut off during the operation of the hydrogen generation apparatus 100 due to power outage or the like, the above-described depressurizing operation cannot be performed. In this case, if the inside of the reformer 10 is left sealed, the pressure in the reformer 10 increases due to evaporation of residual water existing in at least one of the evaporator 17 and the reformer 10.

Therefore, as described above, in the hydrogen generation apparatus 100 according to the present embodiment, the depressurizing valve 16 is disposed on the raw material passage 21 at a portion connecting the hydrodesulfurizer 13 and the reformer 10. As a result, if the pressure in the reformer 10 has become a predetermined pressure or higher, the reformer 10 can be depressurized by using the depressurizer 16.

Embodiment 2

A hydrogen generation apparatus according to Embodiment 2 is configured such that, in the hydrogen generation apparatus according to Embodiment 1, the depressurizer includes a branch passage and a depressurizing valve provided on the branch passage, and the branch passage is such that its portion leading to the depressurizing valve is, at least partially, formed as an upward slope.

According to this configuration, the amount of condensation water flowing into the depressurizing valve is reduced. Accordingly, a possibility that a failure occurs in opening the depressurizing valve and thereby the depressurization is not performed is reduced.

Figure 5:
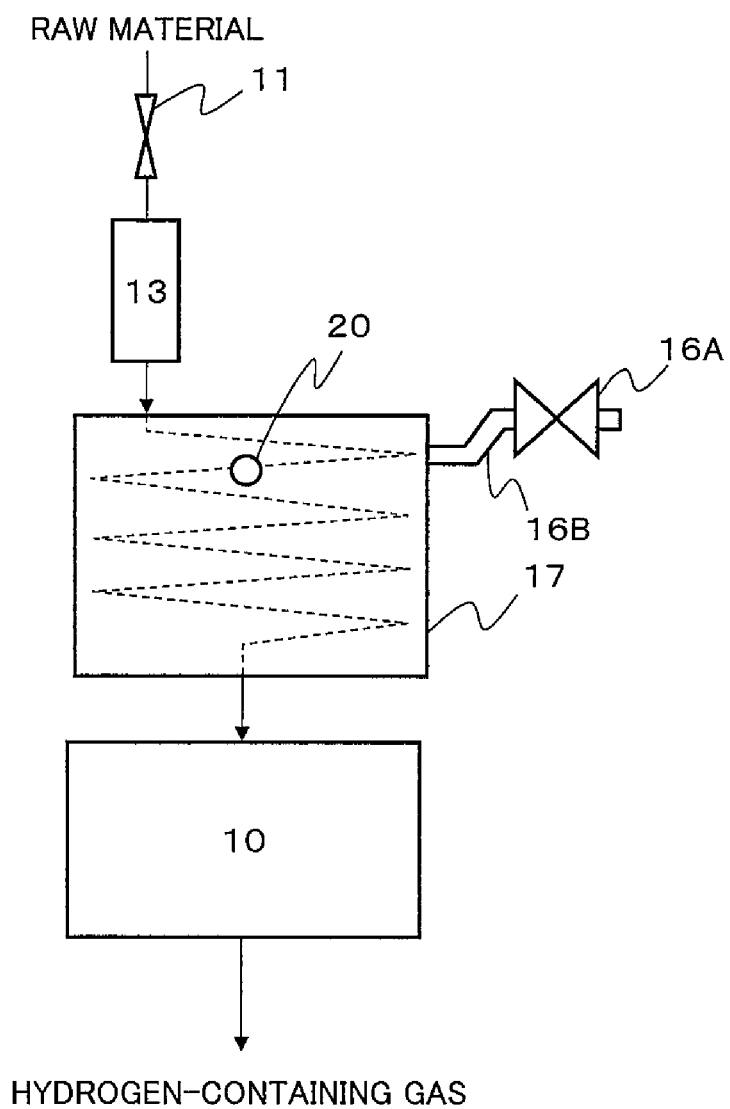
FIG. 5 is a conceptual diagram showing an example of a schematic configuration of a hydrogen generation apparatus according to Embodiment 2.

FIG. 5 is a conceptual diagram showing an example of a schematic configuration of the hydrogen generation apparatus 100 according to Embodiment 2.

As shown in FIG. 5, the hydrogen generation apparatus 100 of this example includes the depressurizing valve 16A and the branch passage 16B. Other components denoted by the same reference signs as those used in FIG. 5 are the same as in the third disposition example of the depressurizer. Therefore, the description of such components is omitted.

The depressurizing valve 16A is provided on the branch passage 16B. Here, the specific configuration is the same as in Embodiment 1. Therefore, the detailed description of the specific configuration is omitted. The branch passage 16B is such that its portion leading to the depressurizing valve 16A is, at least partially, formed as an upward slope. Accordingly, condensation water produced in the upward slope portion of the branch passage 16B flows down through the upward slope portion due to its own weight. As a result, the amount of condensation water flowing into the depressurizing valve 16A is reduced.

Although in this example the depressurizer 16 is disposed in the same manner as in the third disposition example, this is merely an example. The manner of disposing the depressurizer 16 is not limited to this example, and the depressurizer 16 may be disposed in any manner. For example, the depressurizer 16 may be disposed in the same manner as in the first disposition example or the second disposition example.

Embodiment 3

A hydrogen generation apparatus according to Embodiment 3 is configured such that, in the hydrogen generation apparatus according to Embodiment 1 or Embodiment 2, the depressurizer includes a branch passage, a depressurizing valve provided on the branch passage, and a filter provided upstream from the depressurizing valve.

This configuration reduces a possibility that the hydrodesulfurization catalyst that flows out of the hydrodesulfurizer flows into the depressurizer and causes a failure in the depressurizing operation of the depressurizer.

Figure 6:
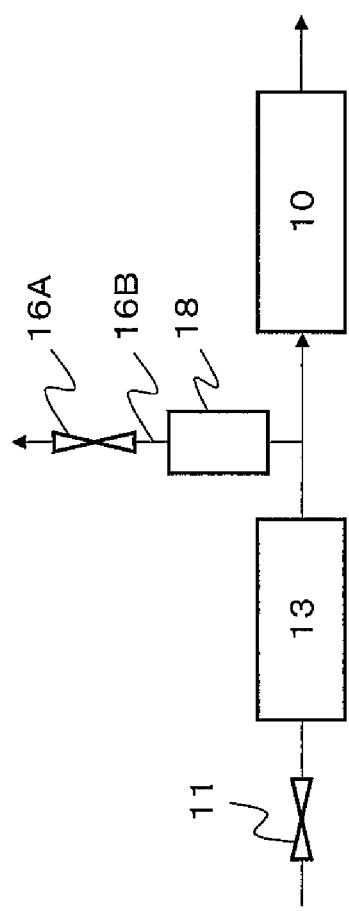
FIG. 6 is a conceptual diagram showing an example of a schematic configuration of a hydrogen generation apparatus according to Embodiment 3.

FIG. 6 is a conceptual diagram showing an example of a schematic configuration of the hydrogen generation apparatus 100 according to Embodiment 3.

As shown in FIG. 6, the hydrogen generation apparatus 100 of this example includes a filter 18. Other components denoted by the same reference signs as those used in FIG. 1 are the same as in Embodiment 1 shown in FIG. 1. Therefore, the description of such components is omitted.

The filter 18 is provided on the branch passage 16B at a position upstream from the depressurizing valve 16A. The filter 18 traps the hydrodesulfurization catalyst that flows toward the depressurizing valve 16A.

Embodiment 4

A hydrogen generation apparatus according to Embodiment 4 is configured such that, in the hydrogen generation apparatus according to any one of Embodiments 1 to 3, the hydrodesulfurizer includes: a hydrodesulfurization catalyst; space formed below the hydrodesulfurization catalyst; and a raw material passage within the hydrodesulfurizer, through which the raw material that has passed through the hydrodesulfurization catalyst flows. The raw material passage is open to the space and includes an upward slope portion.

This configuration reduces a possibility that the hydrodesulfurization catalyst that has been powdered within the hydrodesulfurizer due to continuous use of the hydrogen generation apparatus flows into the depressurizer and causes a failure in the depressurizing operation of the depressurizer.

Figure 7:
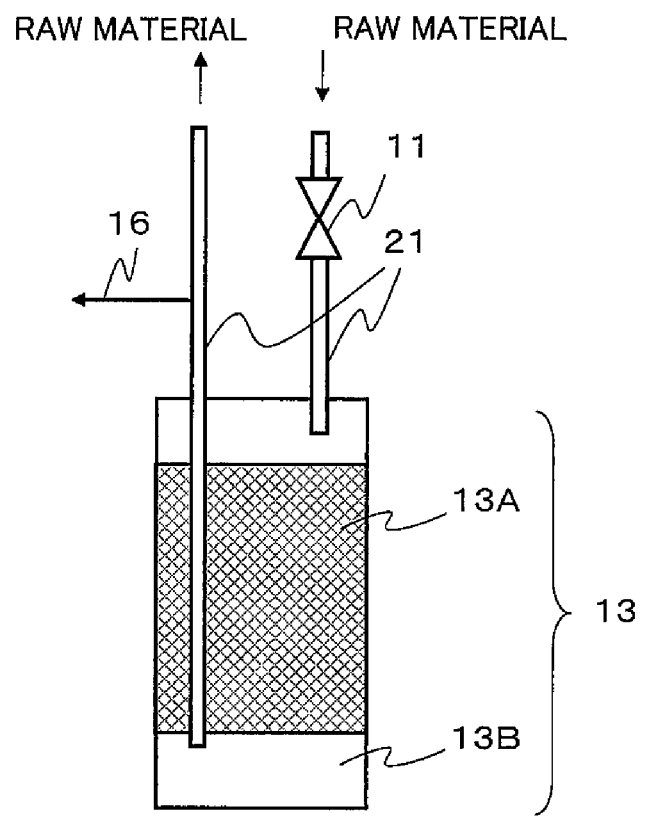
FIG. 7 is a conceptual diagram showing an example of a schematic configuration of a hydrogen generation apparatus according to Embodiment 4.

FIG. 7 is a conceptual diagram showing an example of a schematic configuration of the hydrogen generation apparatus 100 according to Embodiment 4.

As shown in FIG. 7, in the hydrogen generation apparatus 100 of this example, the hydrodesulfurizer 13 includes a hydrodesulfurization catalyst 13A and space 13B. Other components denoted by the same reference signs as those used in FIG. 1 are the same as in Embodiment 1 shown in FIG. 1. Therefore, the description of such components is omitted.

The hydrodesulfurization catalyst 13A serves to remove sulfur compounds from the raw material. Since the specific structure of the catalyst is the same as in Embodiment 1. Therefore, the description of the specific catalyst structure is omitted.

In a container containing the hydrodesulfurization catalyst 13A, the space 13B is formed below the hydrodesulfurization catalyst 13A. The hydrodesulfurization catalyst 13A is powdered within the hydrodesulfurizer 13 due to continuous use of the hydrogen generation apparatus 100. The powdered hydrodesulfurization catalyst 13A is stored in the space 13B.

The raw material passage 21 through which the raw material that has passed through the hydrodesulfurization catalyst flows is provided within the hydrodesulfurizer 13. The raw material passage 21 is open to the space 13B and includes an upward slope portion. If there is no space 13B, it is possible that the raw material that has passed through the hydrodesulfurization catalyst flows into the opening of the raw material passage 21 together with the powdered hydrodesulfurization catalyst, which may result in that the hydrodesulfurization catalyst 13A flows into the depressurizer 16. Since the space 13B is formed below the hydrodesulfurization catalyst 13A, the powdered hydrodesulfurization catalyst is trapped in the space 13B. As a result, flowing of the hydrodesulfurization catalyst into the opening of the raw material passage 21 is suppressed. It should be noted that the opening of the raw material passage 21 may be disposed at such a position as not to cause the powdered hydrodesulfurization catalyst stored in the space 13B to come into contact with the opening. In this manner, flowing of the powdered hydrodesulfurization catalyst into the opening of the raw material passage 21 is further suppressed.

Embodiment 5

A fuel cell system according to Embodiment 5 includes: the hydrogen generation apparatus according to any one of Embodiments 1 to 4; and a fuel cell configured to generate electric power by using the hydrogen-containing gas that is supplied from the hydrogen generation apparatus.

According to this configuration, discharging of hydrogen sulfide remaining in the hydrodesulfurizer to the outside of the hydrogen generation apparatus is suppressed as compared to a case where the depressurizer is provided upstream from the hydrodesulfurizer.

Figure 8:
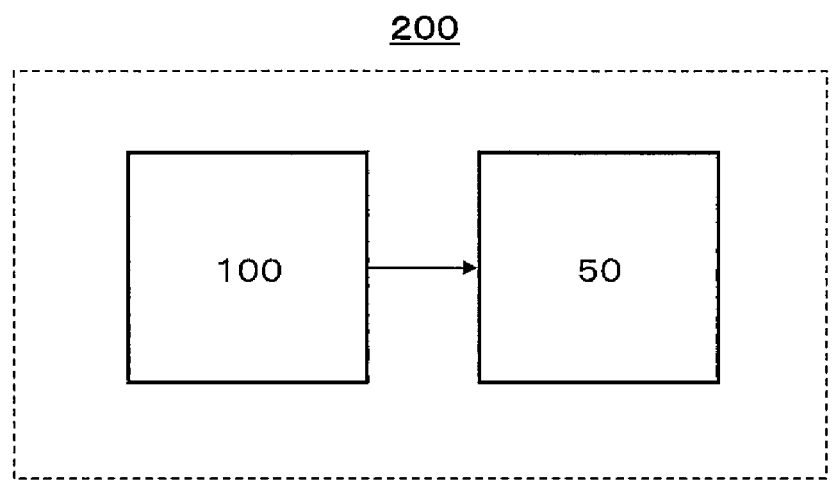
FIG. 8 is a block diagram showing an example of a fuel cell system according to Embodiment 5.

FIG. 8 is a block diagram showing an example of a schematic configuration of a fuel cell system 200 according to Embodiment 5.

In the example shown in FIG. 8, the fuel cell system 200 according to the present embodiment includes the hydrogen generation apparatus 100 according to Embodiment 1 and a fuel cell 50.

The fuel cell 50 generates electric power by using the hydrogen-containing gas that is supplied from the hydrogen generation apparatus 100. The fuel cell 50 may be any type of fuel cell. For example, a polymer electrolyte fuel cell (PEFC), a solid oxide fuel cell, or a phosphoric-acid fuel cell may be used as the fuel cell 50.

When performing a power generation operation, the fuel cell system 200 generates electric power by using the hydrogen-containing gas that is supplied from the hydrogen generation apparatus 100. Assuming the fuel cell 50 to be the hydrogen utilization equipment according to Embodiment 1, then the operation of the hydrogen generation apparatus 100 according to the present embodiment is the same as the operation of the hydrogen generation apparatus 100 according to Embodiment 1. Therefore, the detailed description of the operation of the hydrogen generation apparatus 100 is omitted.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The configurations and/or functional details may be substantially altered without departing from the spirit of the present invention.

INDUSTRIAL APPLICABILITY

In one mode of the present invention, discharging of hydrogen sulfide remaining in the hydrodesulfurizer to the outside of the hydrogen generation apparatus is suppressed as compared to a case where the depressurizer is provided upstream from the hydrodesulfurizer. Thus, the present invention is applicable to a hydrogen generation apparatus and a fuel cell system including the hydrogen generation apparatus.

REFERENCE SIGNS LIST 10 reformer
11 valve
12 combustor
13 hydrodesulfurizer
13A hydrodesulfurization catalyst
13B space
15 sealer
16 depressurizer
16A depressurizing valve
16B branch passage
17 evaporator
18 filter
20 water inlet
21 raw material passage
22 hydrogen guide passage
24 hydrogen supply passage
25 water supply passage
30 controller
40 tank
50 fuel cell
100 hydrogen generation apparatus
150 hydrogen utilization equipment
200 fuel cell system

The invention claimed is:

1. A hydrogen generation apparatus comprising:
a reformer configured to generate a hydrogen-containing gas by using a raw material and steam;
a raw material passage through which the raw material that is supplied to the reformer flows, one end of the raw material passage being connected to the reformer;
a most downstream valve disposed on the raw material passage;
a hydrodesulfurizer provided downstream from the most downstream valve on the raw material passage, configured to remove a sulfur compound from the raw material, and the raw material passage passes through the hydrodesulfurizer;
a sealer provided on a passage downstream from the reformer and configured to block communication between the reformer and an outside of the hydrogen generation apparatus; and a depressurizer provided on the raw material passage at a portion connecting the hydrodesulfurizer and the reformer and configured to release, to an atmosphere, pressure in the reformer that has increased after the sealer is closed, wherein no valve is provided on the raw material passage between the hydrodesulfurizer and the reformer.

2. The hydrogen generation apparatus according to claim 1, comprising:

an evaporator configured to generate steam; and a water passage connected to the evaporator, wherein the evaporator is provided on the raw material passage, and in the evaporator, the depressurizer is disposed at a position away from a passage through which water having flowed into the evaporator flows.

3. The hydrogen generation apparatus according to claim 2, wherein in the evaporator, the depressurizer is provided on a passage upstream from a water inlet of the evaporator, the water inlet allowing water from the water passage to flow into the evaporator.

4. The hydrogen generation apparatus according to claim 3, wherein in the evaporator, the depressurizer is disposed at a position above the water inlet.

5. The hydrogen generation apparatus according to claim 1, wherein the depressurizer includes a branch passage and a depressurizing valve provided on the branch passage, and the branch passage includes a portion leading to the depressurizing valve being, at least partially, formed as an upward slope.

6. The hydrogen generation apparatus according to claim 1, wherein the depressurizer includes a branch passage, a depressurizing valve provided on the branch passage, and a filter provided upstream from the depressurizing valve.

7. The hydrogen generation apparatus according to claim 1, wherein:

the hydrodesulfurizer includes:

a hydrodesulfurization catalyst; and a space formed below the hydrodesulfurization catalyst;

wherein the raw material flows through the raw material passage within the hydrodesulfurizer after the raw material has passed through the hydrodesulfurization catalyst, and the raw material passage is open to the space and includes an upward slope portion.

8. A fuel cell system comprising:

the hydrogen generation apparatus according to claim 1; and a fuel cell configured to generate electric power by using the hydrogen-containing gas that is supplied from the hydrogen generation apparatus.

9. The hydrogen generation apparatus according to claim 1, further comprising a hydrogen gas passage configured to supply a hydrogen-containing gas to the hydrodesulfurizer.

10. The hydrogen generation apparatus according to claim 9, wherein the hydrogen gas passage is connected to the hydrodesulfurizer so that hydrogen-containing gas generated by the hydrogen generation apparatus is supplied to the hydrodesulfurizer.

11. The hydrogen generation apparatus according to claim 1, wherein the hydrodesulfurizer includes at least one of a copper-zinc catalyst, a zinc oxide catalyst and a Mo-based catalyst.

* * * * *